Figure 1:
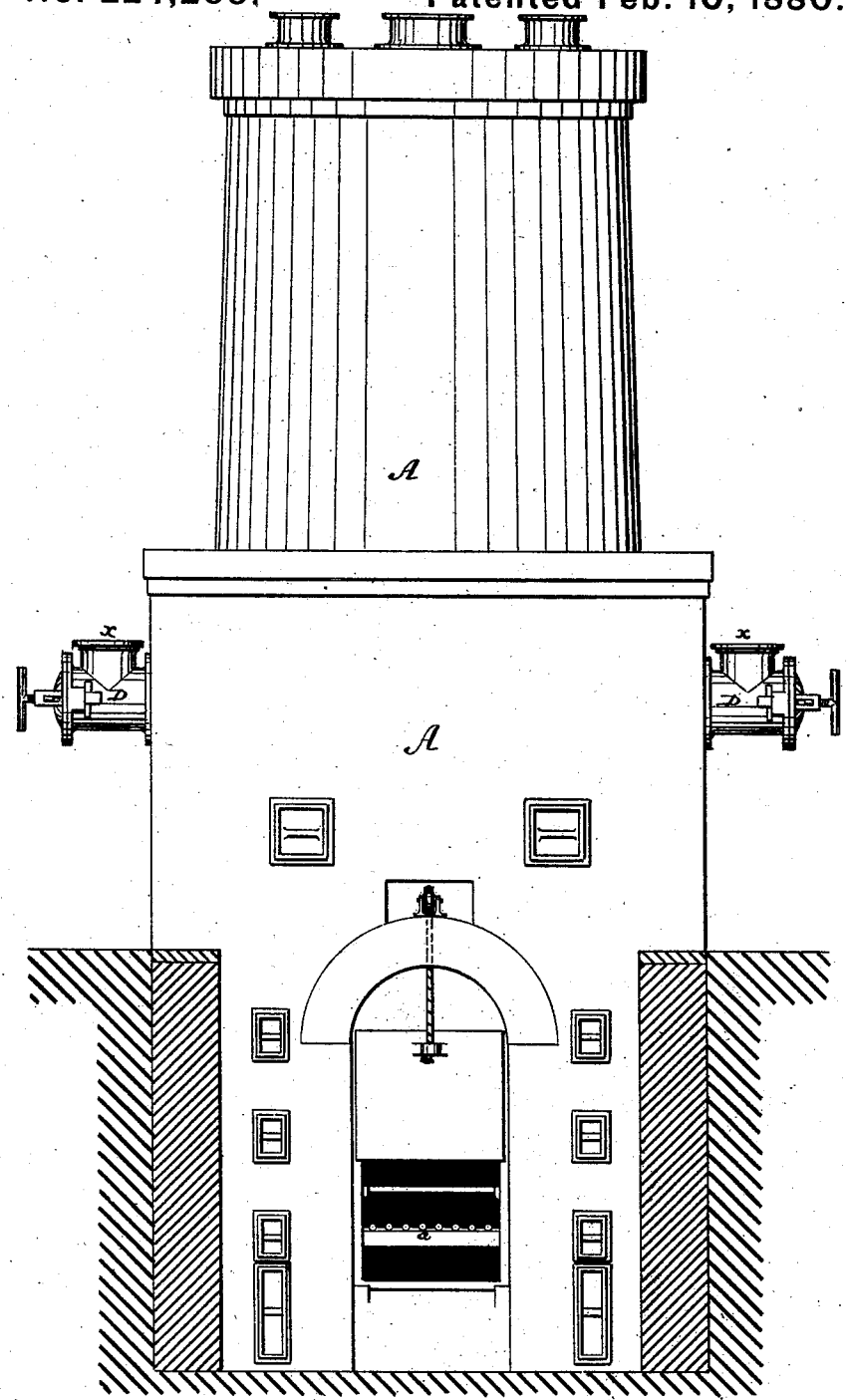

H. Y. ATTRILL & W. FARMER.
Process and Apparatus for Manufacturing Gas for Heating and Illuminating Purposes.
No. 224,266. Patented Feb. 10, 1880.

H. Y. ATTRILL & W. FARMER.
Process and Apparatus for Manufacturing Gas for Heating and Illuminating Purposes.

No. 224,266. Patented Feb. 10, 1880.

United States Patent Office.

HENRY Y. ATTRILL AND WILLIAM FARMER, OF NEW YORK, N. Y.; SAID FARMER ASSIGNOR TO SAID ATTRILL.

PROCESS AND APPARATUS FOR MANUFACTURING GAS FOR HEATING AND ILLUMINATING PURPOSES.

SPECIFICATION forming part of Letters Patent No. 224,266, dated February 10, 1880.

Application filed September 26, 1879.

*To all whom it may concern:*

Be it known that we, HENRY Y. ATTRILL and WILLIAM FARMER, both of New York, in the county and State of New York, have invented certain new and useful Improvements in the Processes and Apparatus for Manufacturing Gas for Heating and Illuminating Purposes, of which the following is a specification.

We can use as the material either a suitable quality of coal or other solid gas-producing material, among which may be any of the shales which are sufficiently bituminous; or we can use petroleum or other fluids having the requisite gas-producing qualities by mingling them with a sufficient quantity of solid material, which may be itself gas-producing or not.

One of the most primitive modes of manufacturing gas from coal was to cause it to descend slowly in a vertical retort properly heated, supplying fresh material at the top and taking away the coke at the bottom. We adopt that general plan; but as heretofore worked the plan involves difficulties which our invention avoids. One was in the removal of the coke, which was only partially overcome by immersing the entire lower end—the delivery end—in a tank of water, and consequently saturating the coke by removing it through the water.

We will describe the operation as conducted with cannel-coal.

By our method, as by other approved modes of manufacture, only a fraction—say from twenty to twenty-five per cent.—of the material is consumed to produce the requisite heat for the decomposition. We can, if preferred, remove the surplus in the form of coke; but in what we esteem the best manner of working we propose to carry the distillation much farther than has been usually practiced, employing the poor gas for heating purposes, while the richer gas, given off at an earlier stage in the process, is taken away through another passage or passages, to be used for illuminating-gas. We carry the distillation so far that the remaining coke will little, if any, more than supply the heat required. In other words, the residuum, after the proper illuminating-gas is taken off, is utilized in the form of a heating-gas, which may be led away through a separate pipe and utilized in any desired manner; but we can take away the whole, or a part, in the form of coke, if preferred.

The perfection to which exhausters and their operation have been carried allows us to maintain on any given pipe exactly the desired amount of pressure or of vacuum. We maintain, by a judicious operation of this well-known apparatus, a pressure in the retort so nearly that of the atmosphere that the upper end may be left entirely open during the brief period requisite for charging.

By suitable means, as a delicately-adjustable valve controlling the passage through a tall stack, we can regulate the draft of the fire so as to hold a neutral line at or near a uniform level near the base of the retort, while allowing the retort to pour its contents directly upon the grate, where it is consumed.

The flue or flues leading from the fire-space at the base of the retort convey what we term the "heating-gas." In addition to the ordinary products of combustion rising from a fire, it is largely loaded with poor gas from the latter portion of the distillation. Roughly, the gases from our fire contain sixty per cent. of inert nitrogen, thirty per cent. of carbonic oxide, capable of yielding much heat by burning into carbonic acid at a subsequent period, two per cent. of carbonic acid, and eight per cent. of poor gas, which is almost all hydrogen—a very valuable fuel. The gas from this source, after being cooled and conducted to any required point, will be found highly valuable as a heating-gas for any purposes in the arts where great heat with little light is required.

The heat is applied to the extreme lower portion of the retort by its direct contact with the fire into which the coke is being slowly delivered. The heat is supplied to the upper portion of the retort through the medium of gas. The required proportion of the heating-gas is taken there directly while retaining its original heat. We provide for receiving and heating a quantity of pure air in suitable flues adjacent to the fire, and for mingling this air in a proper manner with the heated gases, thus providing a long and intense flame, which bathes the entire middle and upper portion of the retort.

We are aware that illuminating-gas has been distilled from coal in retorts, and that the residual coke of such distillation has been discharged into a secondary generator and there converted into a heating-gas by the admission of air and steam. Our invention differs essentially from this, as will appear below.

The accompanying drawings form a part of this specification, and represent what we consider the best means of carrying out the invention.

Figure 2:
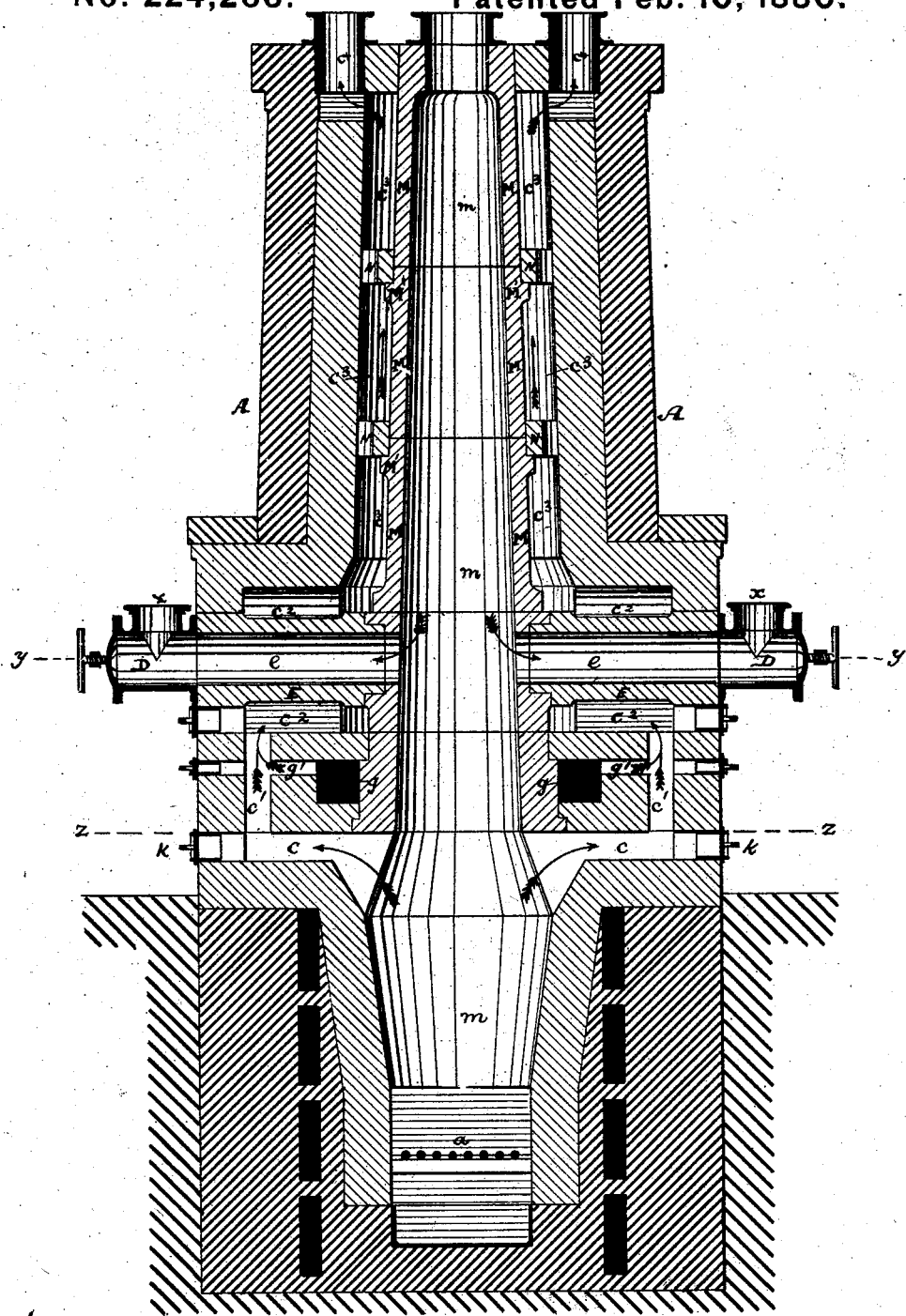
Figure 4:
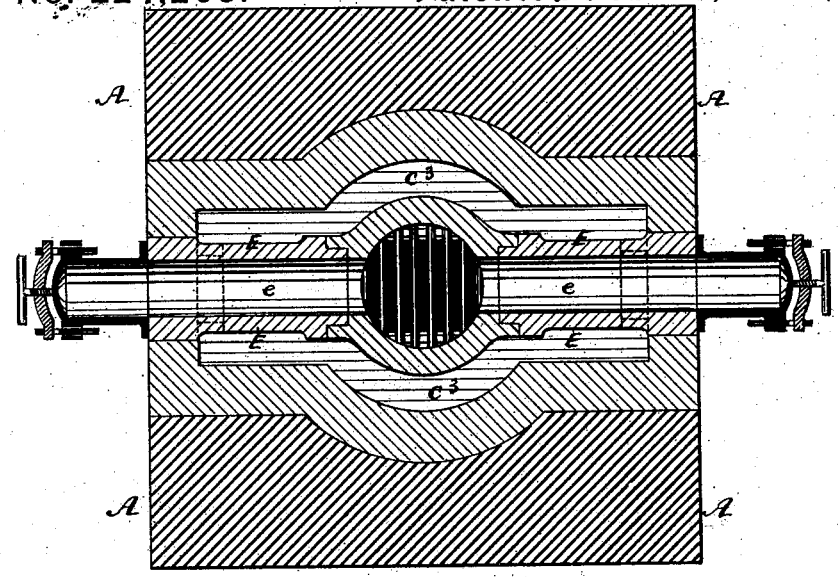
Figure 5:
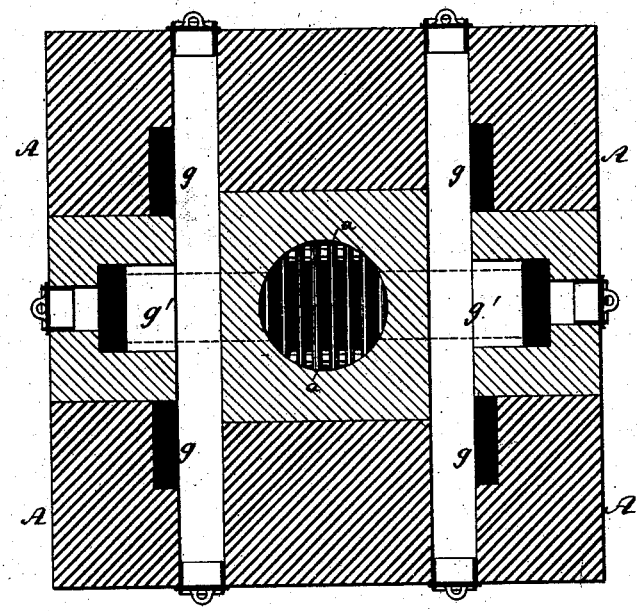

Figure 1 is a front elevation; Fig. 2, a central vertical section; and Fig. 3, a vertical section in a plane at right angle to that in Fig. 2. The remaining figures are horizontal sections. Fig. 4 is a section on the line $y\ y$ in Fig. 2. Fig. 5 is a horizontal section on the line $z\ z$ in Fig. 2.

Similar letters of reference indicate like parts in all the figures.

A is a mass of masonry lined with fire-brick. The grate $a$ may be of any ordinary construction. Ordinary provisions (not shown) allow access of air to feed the flame and facilities for shaking the grate-bars. It will be understood that the fuel-supply is automatic through the descent of the coke from above.

A little above the grate the central vertical chamber $m$ is enlarged. A little higher it is slightly contracted. Above this is a considerable length of straight, vertical, round, smooth retort, of nearly uniform diameter, but gradually decreasing upward.

The top is surmounted by a casting, and may have either an ordinary well-fitted lid or any other suitable provision for making an approximately gas-tight joint.

We will mark the interior of this retort by the single letter $m$. In the enlargement near the bottom the combustion is mainly effected. Above this the material is subjected only to distillation. We provide for intensely heating the retort quite to the top by making an annular chamber around the interior lining between this and the outer coating, and circulating therein a current of the heating-gas received from below with a sufficient supply of fresh air to induce complete combustion. Both the heating-gas and the air supplied thereto being previously heated, the resulting condition is a very high temperature, so that the distillation of the coal commences in the top and proceeds actively, and the coal becomes coked rapidly in its descent.

We have shown a thick mass of masonry exterior to the fire-brick; but these matters of detail may evidently be modified within wide limits.

The gaseous material delivered from the fire in the lower part of the retort $m$ is led outward through flues $c$. Such portion as can be spared for other uses is then taken directly away in its present condition—poor technically, or as regards illumination, but valuable for its heating elements. The remainder is led upward through continuations $c'$ and inward through a spacious chamber, $c^2$, which leads it to an annular space, $c^3$, surrounding the entire upper portion of the chamber $m$.

The material forming the upper part of the chamber $m$ is made in the form of short lengths of tube M, matched tightly together, and steadied in the required position by curved blocks N, resting on shoulders M' at the base, and bracing their outer surfaces against the interior of the surrounding masonry A. They are formed with liberal openings to allow the hot gas to rise freely.

Each section of the tube M may, for small retorts, be made in one piece. For larger ones we propose to make each in four pieces fitted together with vertical joints.

The rich gas which is given off by the moderately-heated coal at the extreme upper portion of the apparatus flows downward, and, being compelled to pass through the more intensely-heated portion below, becomes thoroughly fixed and mixed with the products of a little later distillation, so as to deliver a practically-uniform quality of the best illuminating-gas through the radial passages $e$. These are formed by fire-clay tubes E, which traverse the chambers $c^2$ and deliver the gas into mouth-pieces D, which are formed with any ordinary or suitable provisions for leading the gas up to a hydraulic main, (not represented,) and for allowing the coke to be withdrawn through these passages, if desired. When commercial coke is to be removed by this means, we propose to employ an endless screw, with provisions for moving it in and out, as well as rotating it at proper intervals.

We provide deep narrow flues $g$, into which fresh air is admitted and caused to return several times. From the upper convolution it is led outward through a passage, $g'$, and mingles with the heating-gas rising in the passage $c'$. The union of the fresh air, already highly heated, with the hot combustible gas induces a long and hot flame, which fills the annular chamber $c^3$ and bathes the entire upper sections of the tubular structure M.

Such portion of the heating-gas flowing outward through the flue $c$ as is not required to maintain the temperature for the distillation is led away through the outlets $k$, from whence it may be conducted in any desired direction, and utilized in any manner on the same premises, to impart heat for manufacturing purposes; or it may be carried through pipes in the streets to distant points where heat and not light is required.

It will be observed that there are four principal zones in this furnace, retort, or cupola. The upper is the drying and heating zone. The next is the carbonizing and illuminating-gas zone, from which the gas is drawn out through the passages $e$ and outlets marked $x\ x$. The next is the neutral zone, which lies between the illuminating and heating gas outlets, and the next or lowest is the furnace or heating-gas zone.

Modifications may be made in many of the details without sacrificing the advantages of our invention. We can bevel the junction of the radial passages $e$ to the central upright passage $m$ in the same manner as the corresponding junctions of the passages $c$ are formed. This will facilitate the descent of the coke when, as in our preferable mode of working, all the coke is to be burned; or we can widen the junctions of the passages $e$ until they extend quite around a tubular lining, M, which is only perforated to allow the outflow of the gas. In such case we could not extract the coke, but would necessarily pass it all down to the fire.

Some of the openings, with stoppers provided for clearing the flues, may be omitted, or more may be provided. All the exhausters and other ordinary or suitable attachments and appliances used in connection with analogous work may be applied with our invention. We propose to provide a gas-holder for the heating-gas, with a liberal passage therefrom through which to supply the stored gas to invigorate the fire at any moment when, through inattention or any cause, the heat from the ordinary sources has become temporarily deficient.

We can employ three or other larger number of final exit-flues for the products of combustion in place of the two passages $c^4$ represented; or we can dispense with one of these and employ only one, leading the spent gases therefrom directly to a stack. (Not represented.)

Figure 3:
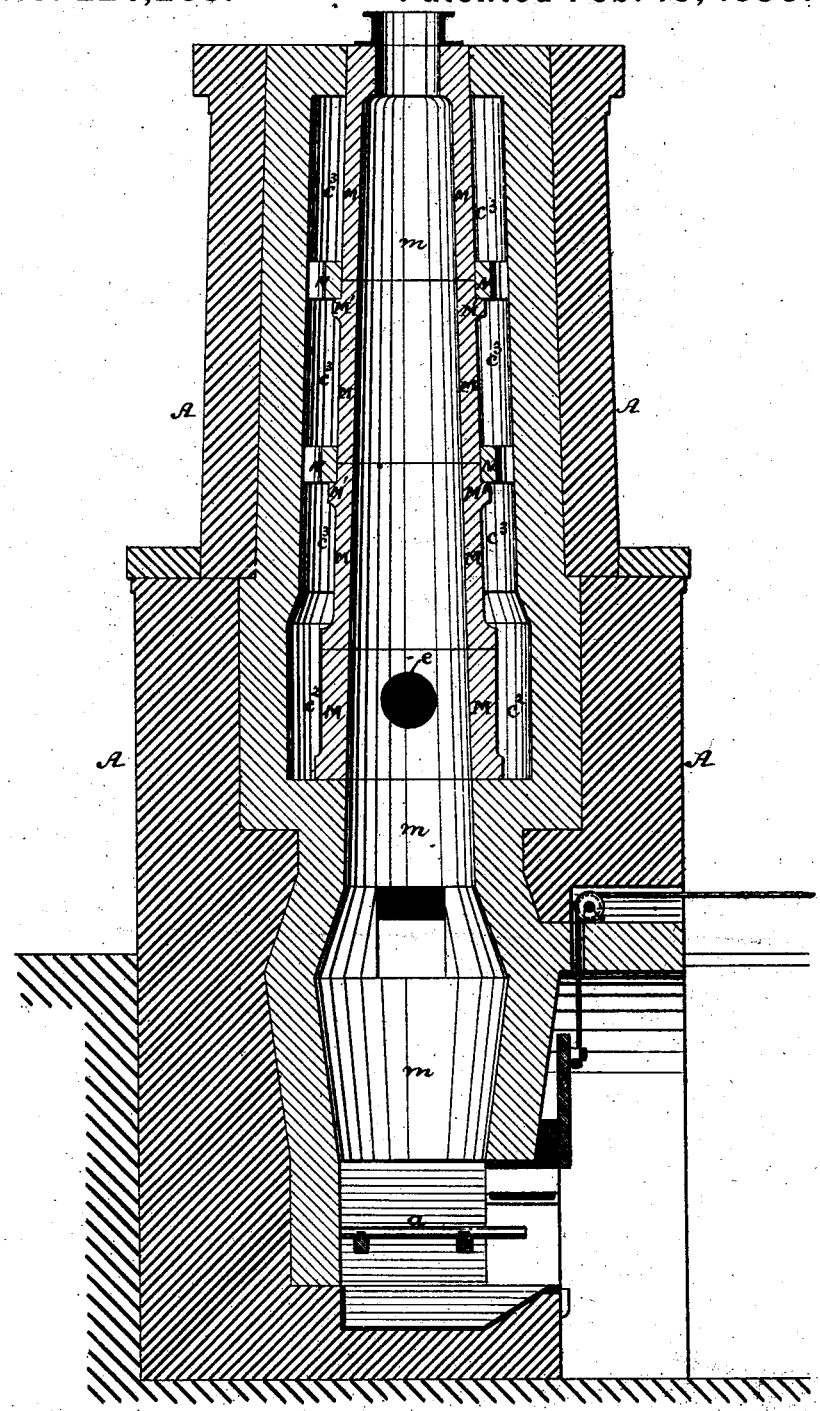

We can use a step-grate at the front of the furnace, and a balanced door, as indicated in Figs. 1 and 3, or any other suitable means of conveniently adjusting the draft.

We may in some instances, especially for large forms of the apparatus, prefer to take away the illuminating-gas through a pipe of iron or other material, which shall descend from the top in the center of the vertical chamber or vertical retort $m$ down to a proper distance. It may not be necessary to extend such pipe quite down to the level of the flues $e$; but we esteem it important that the gas be caused to traverse downward from the upper points, where it first begins to be liberated, so that no gas shall be delivered in a too rich or too poor condition, but all will be fixed and thoroughly mingled by compelling that first liberated, as well as all the rest, to pass through an intensely-heated portion of the coke.

At will steam may be let into the furnace under the grate, if desired. We believe this means of adding hydrogen may, by this apparatus, be made highly advantageous, ordinary means being employed to remove the carbonic acid resulting from the union of the oxygen of the steam with the carbon of the coke.

The retorts or cupolas may be oval, square, circular, or oblong in shape, and a series of them may be set over the same furnace. The retorts or cupolas may also be set either vertically or in any angle between forty five degrees and ninety degrees. They can be worked largely by steam-power.

The coal or other material can be raised in elevators and moved along by conveyers. It can be conveyed into the top of the retorts by any approved means which will afford an airlock, as revolving hollow cylinders with two or more chambers made air-tight and worked by hand or other power. This may be made the subject of a further application for patent.

We propose to make the bars of the grate saw-shaped, and to draw to and fro by hand, steam, or other power. This may be made the subject of a further application.

We claim as our invention—

1. The within-described process for the manufacture of gas, consisting in causing the gas-producing material to traverse slowly through a generator, and be subjected to a continuous or increasing high temperature, and distilled to different degrees, and drawing off and conducting away independently different grades of gas at different points in the generator, as herein specified.

2. The within-described mode of operation to produce gases of different grades, consisting in, first, causing the gas-producing material to slowly traverse the generating-chamber; second, admitting air and maintaining the residuum of said material in a state of partial combustion; third, heating thereby a current of air for subsequent application to the gas; fourth, withdrawing the poor gas mixed with the carbonic oxide resulting from the partial combustion of the residuum; fifth, separating and conducting away a portion of the mixed gases; sixth, admitting the heated air to the remainder of the mixed gases and burning them; seventh, heating thereby the part of the chamber in which fresh material is introduced; eighth, distilling by such heat the gases and vapors from the freshly-introduced charges; ninth, passing said vapors and gases through partially-distilled and coked portions which have a higher temperature; and, tenth, withdrawing the illuminating-gas without admixture with the poor gas, the two gases being kept separate, as herein specified.

3. The combination of the chamber or stack $m$, having a combustion-chamber at the bottom, with the independent pipes $e$ and $c$, for withdrawing the gases of different grades without admixture, substantially as described.

4. The combination of the chamber $m$, having combustion-chamber at the bottom, and the flue $c^3$ surrounding its upper part, with the independent pipes $e$ and $c$, the latter communicating with the flue $c^3$, substantially as described.

5. The apparatus described, having in combination the upright vertical retort $m$, surrounding flue $c^3$, fire-grate $a$, provisions $e$ for taking away the illuminating-gas, provisions $c\ c'\ c^2\ c^3$ for taking away and utilizing the poor or heating gas, and passages $g\ g'$, for supplying heated air to mingle with the products of combustion and supply heat to the material at the early stages of its distillation, substantially as herein specified.

In testimony whereof we have hereunto set our hands this 20th day of September, 1879, in the presence of two subscribing witnesses.

H. Y. ATTRILL.
WM. FARMER.

Witnesses:
THOMAS D. STETSON,
WM. C. DEY.